(12) United States Patent
Turney

(10) Patent No.: US 11,161,621 B2
(45) Date of Patent: Nov. 2, 2021

(54) HEAT EXCHANGER WITH MOVING ICE FILTER

(71) Applicant: United Technologies Corporation, Farmington, CT (US)

(72) Inventor: Joseph Turney, Amston, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 813 days.

(21) Appl. No.: 15/874,274

(22) Filed: Jan. 18, 2018

(65) Prior Publication Data
US 2019/0217965 A1 Jul. 18, 2019

(51) Int. Cl.
| | | |
|---|---|---|
| *B01D 46/00* | (2006.01) |
| *B64D 33/10* | (2006.01) |
| *F02C 7/143* | (2006.01) |
| *F02C 7/057* | (2006.01) |
| *B64D 13/00* | (2006.01) |
| *F28F 19/01* | (2006.01) |

(Continued)

(52) U.S. Cl.
CPC .............. *B64D 33/10* (2013.01); *B64D 13/00* (2013.01); *F02C 7/057* (2013.01); *F02C 7/143* (2013.01); *F28D 9/0062* (2013.01); *F28F 19/006* (2013.01); *F28F 19/01* (2013.01); *B01D 46/18* (2013.01); *F28D 11/02* (2013.01); *F28D 2021/0021* (2013.01); *F28F 2250/106* (2013.01)

(58) Field of Classification Search
CPC ......... B64D 33/10; B64D 13/00; F28F 19/01; F28F 19/006; F28F 2250/106; F28D 9/0062; F28D 2021/0021; F28D 11/02; F02C 7/143; F02C 7/057; B01D 46/18

See application file for complete search history.

(56) References Cited

U.S. PATENT DOCUMENTS

| | | | |
|---|---|---|---|
| 3,208,234 A | 9/1965 | Messinger | |
| 3,233,391 A * | 2/1966 | Olsen ..................... | B01D 46/18 55/290 |

(Continued)

FOREIGN PATENT DOCUMENTS

| | | | |
|---|---|---|---|
| GB | 2491123 A | 11/2012 | |
| JP | 2019073055 A * | 5/2019 | .............. F24F 13/28 |
| WO | 2008010418 A1 | 1/2008 | |

OTHER PUBLICATIONS

European Patent Office, Extended European Search Report, Application No. 19152638.3-1008, dated Jun. 26, 2019 (7 pp.).

*Primary Examiner* — Dung H Bui
(74) *Attorney, Agent, or Firm* — Cantor Colburn LLP

(57) ABSTRACT

Disclosed is a heat exchanger for a thermal management system of an aircraft assembly, the heat exchanger including: a core including a first side with a first core inlet, a second side opposing the first side and includes a first core outlet, the first core inlet is in fluid communication with the first core outlet, a third side having a second core inlet and a fourth side opposing the third side and includes a second core outlet, the second core inlet is in fluid communication with the second core outlet, and a screen wrapped around the core, the screen covering the first core inlet and the first core outlet, and a plurality of rollers disposed between the core and the screen for movably securing the screen to the core, the rollers engaging the screen and movement of at least one of the rollers moves the screen about the core.

18 Claims, 5 Drawing Sheets

(51) Int. Cl.
  *F28F 19/00*   (2006.01)
  *F28D 9/00*   (2006.01)
  *F28D 21/00*   (2006.01)
  *F28D 11/02*   (2006.01)
  *B01D 46/18*   (2006.01)

(56) References Cited

U.S. PATENT DOCUMENTS

| | | | | |
|---|---|---|---|---|
| 3,487,620 A * | 1/1970 | Klein | | F23J 15/04 |
| | | | | 96/277 |
| 3,675,393 A * | 7/1972 | Meade | | B01D 46/18 |
| | | | | 95/214 |
| 3,717,978 A * | 2/1973 | Osborne, Jr. | | B01D 46/18 |
| | | | | 96/230 |
| 4,057,105 A * | 11/1977 | Bailey | | B60K 11/04 |
| | | | | 165/119 |
| 5,232,477 A * | 8/1993 | Kurr | | B01D 46/18 |
| | | | | 55/290 |
| 5,529,593 A | 6/1996 | Simmons | | |
| 5,915,469 A | 6/1999 | Abramzon et al. | | |
| 6,152,998 A * | 11/2000 | Taylor | | B01D 46/18 |
| | | | | 55/354 |
| 6,162,286 A * | 12/2000 | Hasama | | B01D 46/0082 |
| | | | | 95/281 |
| 7,073,573 B2 * | 7/2006 | Agee | | F28D 9/0062 |
| | | | | 165/146 |
| 8,828,119 B2 * | 9/2014 | Montie | | F28D 21/0015 |
| | | | | 95/43 |
| 9,151,539 B2 * | 10/2015 | Army | | B64D 13/06 |
| 10,281,219 B2 * | 5/2019 | Mizushita | | F28F 3/08 |
| 2005/0178734 A1 * | 8/2005 | Kilmer | | B01D 33/056 |
| | | | | 210/791 |
| 2009/0113857 A1 * | 5/2009 | Sithes | | B23K 37/006 |
| | | | | 55/293 |
| 2009/0113860 A1 * | 5/2009 | Sithes | | B01D 46/42 |
| | | | | 55/385.2 |
| 2010/0026967 A1 * | 2/2010 | Yamagishi | | B01D 46/18 |
| | | | | 353/61 |
| 2011/0030323 A1 * | 2/2011 | Vinson | | B01D 46/0065 |
| | | | | 55/385.1 |
| 2011/0067388 A1 * | 3/2011 | Zhang | | B01D 46/446 |
| | | | | 60/311 |
| 2013/0193127 A1 * | 8/2013 | Scipio | | F02C 7/047 |
| | | | | 219/201 |
| 2013/0306264 A1 * | 11/2013 | Zeolla | | F24F 13/082 |
| | | | | 165/11.1 |
| 2014/0093351 A1 | 4/2014 | Motakef et al. | | |
| 2018/0058780 A1 * | 3/2018 | Nishiyama | | F28F 1/128 |
| 2018/0093217 A1 * | 4/2018 | Mislak | | B01D 46/008 |
| 2018/0149089 A1 * | 5/2018 | Elder | | F02C 3/04 |
| 2018/0231336 A1 * | 8/2018 | Baxter | | F28F 19/01 |
| 2018/0355990 A1 * | 12/2018 | Simpson | | F16K 31/025 |
| 2019/0033016 A1 * | 1/2019 | Aoki | | F02C 7/14 |

* cited by examiner

HEAT EXCHANGER WITH MOVING ICE FILTER

BACKGROUND

Exemplary embodiments pertain to a heat exchanger of a gas turbine engine and more particularly, to a heat exchanger with a moveable screen.

Compact plate-fin heat exchangers may be used in aircraft systems to reject waste heat to a cold airstream. The cold airstream may originate from ambient air and may contain humidity which may cause icing in components, such as heat exchangers, when air is cooled below the freezing point.

Implements for dealing with icing of heat exchangers may include keeping an airstream above freezing, which may result in a performance detriment. Implements may include oversizing the heat exchanger to manage wall temperatures, minimize ice accumulation and melt accreting ice, which may result in a weight and volume detriment. Implementing bypasses and defrost cycles to periodically melt ice may result in a performance detriment. As such, an alternative implement is desired.

BRIEF DESCRIPTION

Disclosed is a heat exchanger for a thermal management system of an aircraft assembly, the heat exchanger comprising: a core including a first side with a first core inlet, a second side that opposes the first side and includes a first core outlet, wherein the first core inlet is in fluid communication with the first core outlet, a third side having a second core inlet and a fourth side that opposes the third side and includes a second core outlet, wherein the second core inlet is in fluid communication with the second core outlet, and a screen wrapped around the core, the screen covering the first core inlet and the first core outlet, and a plurality of rollers disposed between the core and the screen for movably securing the screen to the core, the plurality of rollers engaging the screen and wherein movement of at least one of the plurality of rollers causes the screen to move about the core.

In addition to the above features, or as an alternative, the heat exchanger includes a motor that drives the at least one roller of the plurality of rollers.

In addition to the above features, or as an alternative, the heat exchanger is a cross-flow plate-fin heat exchanger, the heat exchanger core comprises a fifth side and an opposing sixth side, wherein the fifth side comprises a first cap sheet and the sixth side comprises a second cap sheet.

In addition to the above features, or as an alternative, the screen covers the first side of the core, the second side of the core, the fifth side of the core and the sixth side of the core, and wherein the set of rollers includes a first set of rollers disposed between the fifth side of the core and the screen and a second set of rollers disposed between the sixth side of the core and the screen.

In addition to the above features, or as an alternative, the screen covers the first side of the core, the second side of the core, the third side of the core and the fourth side of the core.

In addition to the above features, or as an alternative, the set of rollers includes a first set of rollers disposed between the third side of the core and the screen and a second set of rollers disposed between the fourth side of the core and the screen.

In addition to the above features, or as an alternative, the set of rollers includes a first set of rollers disposed between the first side of the core and the screen and a second set of rollers disposed between the second side of the core and the screen.

In addition to the above features, or as an alternative, electrical connectors are connected to the screen for transferring electric current to the screen.

In addition to the above features, or as an alternative, an enclosure encloses the screen and the core, and the enclosure fluidly connects a cavity defined between the enclosure and the core to the first core outlet.

Further disclosed is an aircraft, comprising: a gas turbine engine operatively coupled to the aircraft, the gas turbine engine comprising a fan, a compressor, a combustor and a turbine; and a thermal management system operatively coupled to the gas turbine engine, the thermal management system including a heat exchanger with one or more of the above disclosed features.

Further disclosed is a method of moving an ice screen about a core of a heat exchanger, the heat exchanger being operatively coupled to a gas turbine engine, the method comprising: movably securing the ice screen about the core of the heat exchanger, wherein the ice screen covers an inlet and an outlet of the heat exchanger, and moving the ice screen about the core by rotating at least one of a plurality of rollers located between the core and the ice screen.

In addition to the above features, or as an alternative, the step of moving the ice screen about the core alternatively positions a first portion of the ice screen over a first core inlet disposed at a first side of the core and a first core outlet disposed at a second side of the core, wherein the core is box shaped and the first side of the core opposes the second side of the core.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
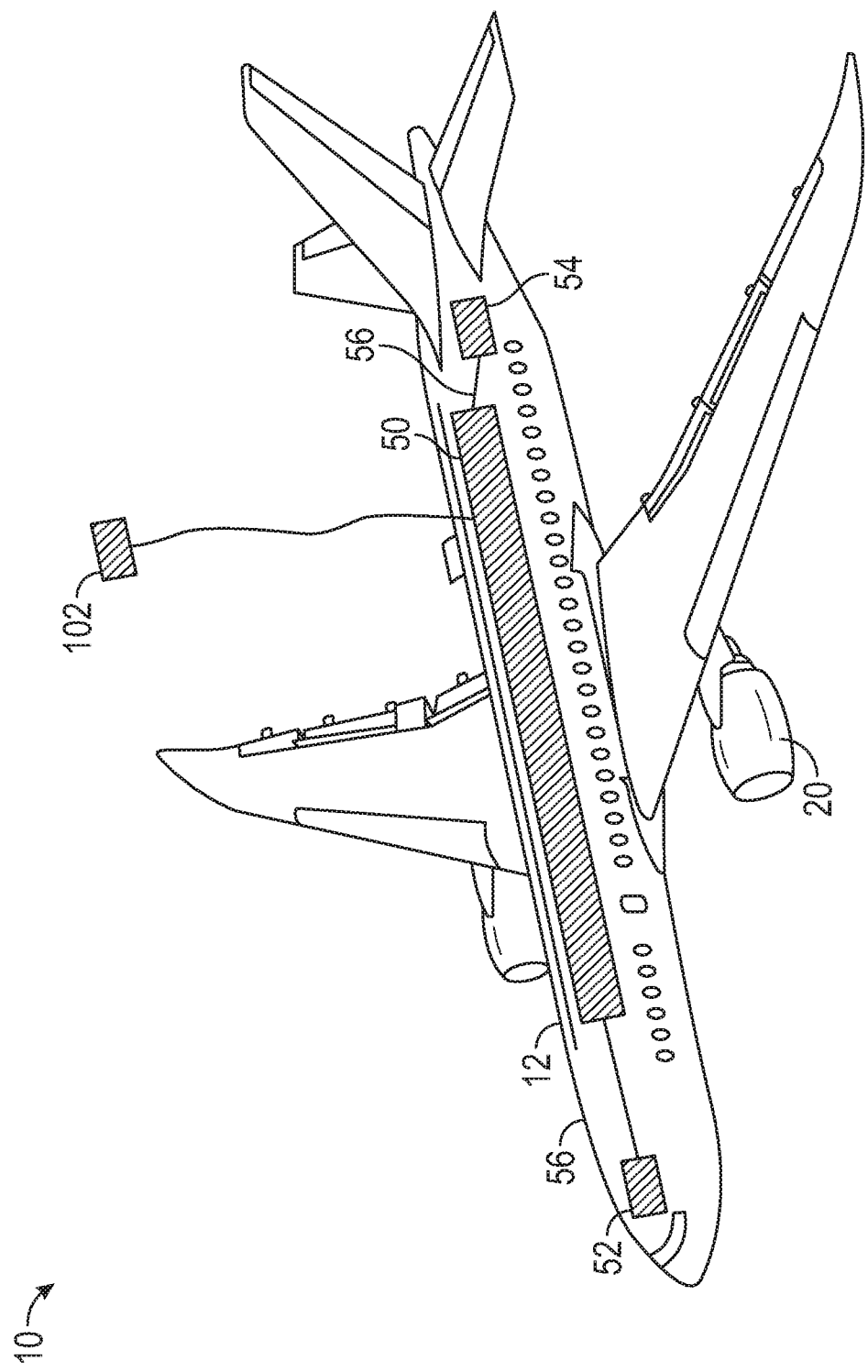
FIG. 1 is a perspective view of an aircraft.
Figure 2:
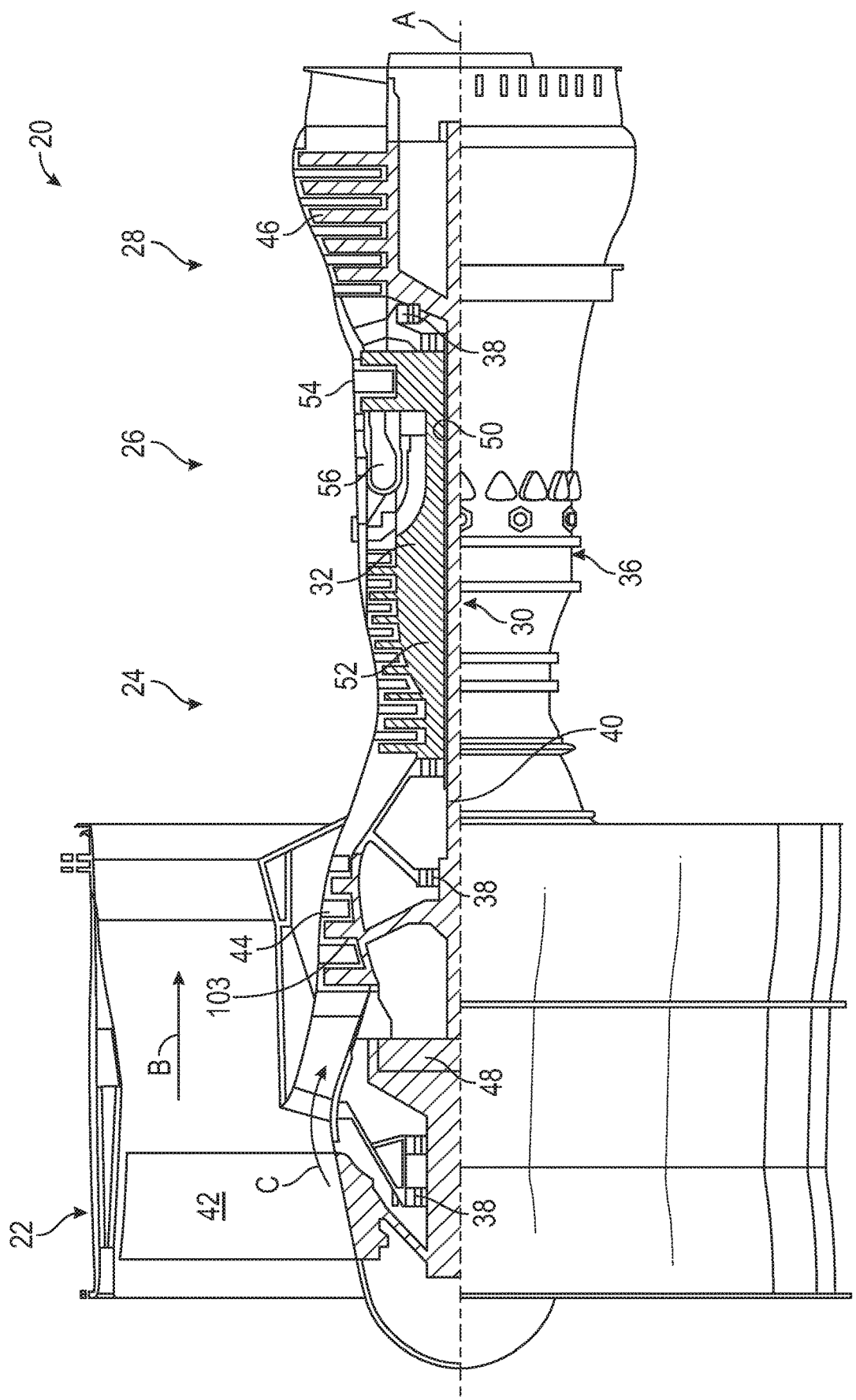
FIG. 2 is a partial cross sectional view of a gas turbine engine.

FIG. 1 illustrates an aircraft assembly 10 having an aircraft fuselage 12 and a gas turbine engine 20, and FIG. 2 schematically illustrates the gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclical gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

The aircraft assembly 10 may include a thermal management system 50 used to control atmospheric conditions for various aircraft systems from the cockpit 52 to avionics 54. These systems may be connected to the thermal management system by typical aircraft mechanicals 56 including tubing, piping 56 and the like. The thermal management system 50 may include a heat exchanger 102 illustrated in detail in FIGS. 3-7 and discussed in greater detail below. The heat exchanger 102 may utilize a first stream 112 of cold air to cool a second stream 114 of warm air so the warm air may be further utilized in the thermal management system 50. The first stream 112 may be obtained from an aircraft bleed 103 off of a compressor 44 in the engine. The first stream 112 may be further cooled prior to reaching the heat exchanger 102 via one or more additional heat exchangers in the engine (not shown). The first stream 112, containing a certain amount of moisture, may develop particles of ice upon reaching the heat exchanger 112, and the ice particles may clog the heat exchanger 102.

Figure 3:
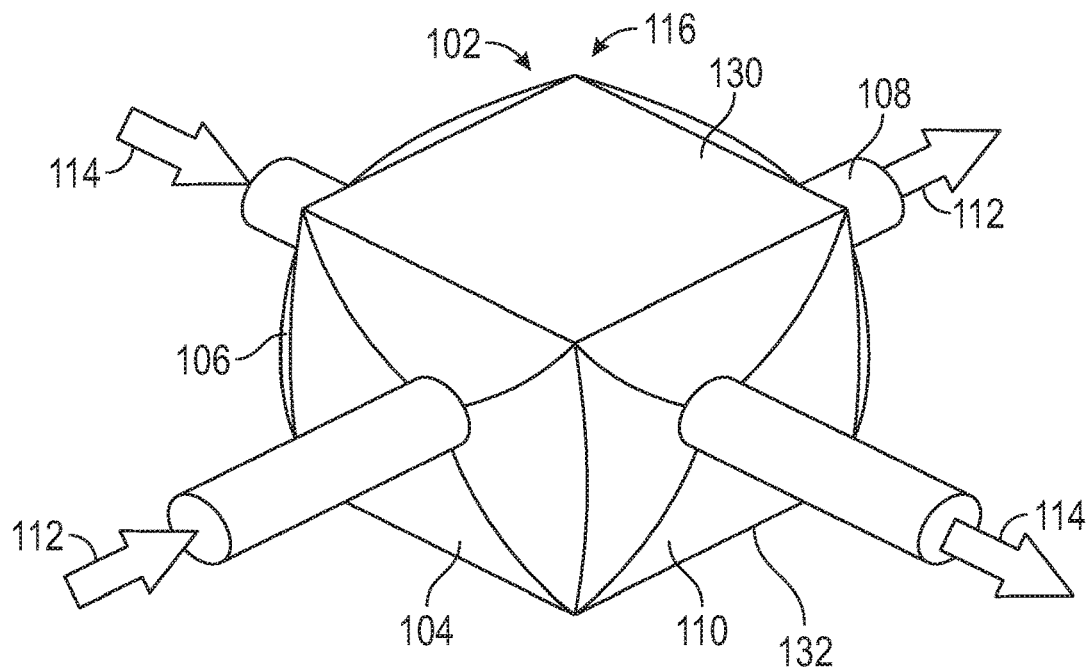
FIG. 3 is a perspective view of a cross-flow plate-fin heat exchanger.
Figure 4:
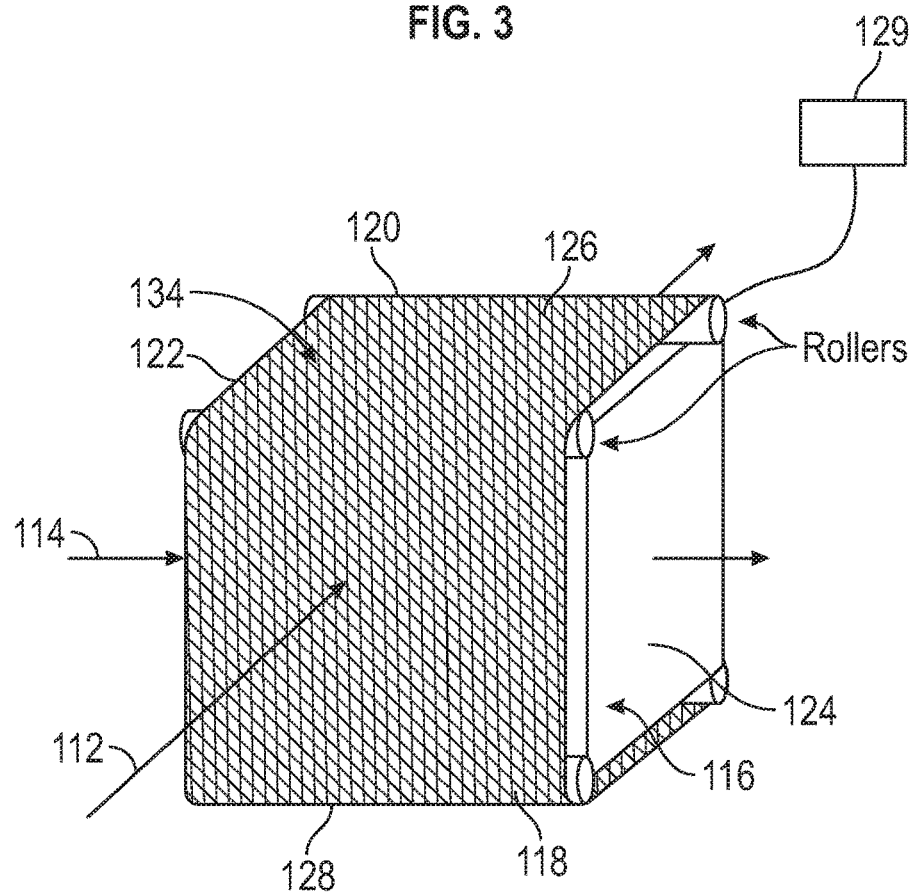
FIG. 4 is a perspective view of a cross-flow plate-fin heat exchanger according to an embodiment.

FIGS. 3-4 illustrate additional details regarding the heat exchanger 102. The heat exchanger 102 may be a cross-flow plate-fin heat exchanger and may include a plurality of headers through which relatively warm or hot and cool or cold streams enter and leave the heat exchanger. The headers include a first inlet header 104, a second inlet header 106, a first outlet header 108 fluidly connected to the first inlet header, and a second outlet header 110 fluidly connected to the second inlet header. The plurality of headers may together direct flow from the first stream 112 and the second stream 114 into and out of a core 116 of the heat exchanger 102.

The core 116 may include six sides 118-128 and may be shaped like a box. Of course, other configurations are considered to be within the scope of the present disclosure. The first inlet header 104 and the first outlet header 108 may respectively cover a first side 118 of the core 116 and an opposing second side 120 of the core 116. The second inlet header 106 and second outlet header 110 may respectively cover a third side 122 of the core 116 and an opposing fourth side 124 of the core 116. A first cap sheet 130 may cover a fifth side 126 of the core 116 and a second cap sheet 132 may cover an opposing sixth side 128 of the core 116.

In one embodiment, a screen 134 is wrapped around four of the side surfaces of the core 116. For example, the screen 134 may cover the first side 118 of the core along with the first core inlet, the second side 120 of the core along with the first core outlet, the fifth side 126 of the core along with the first cap sheet and the sixth side 128 of the core along with the second cap sheet. The adjacent sides which are exposed to hot flow, for example, the third side 122 of the core along with the second core inlet and the fourth side 124 of the core along with the second core outlet, may not be covered by the screen 134. The screen 134 may be continuous and may be a fiber filter or a wire screen.

Figure 5:
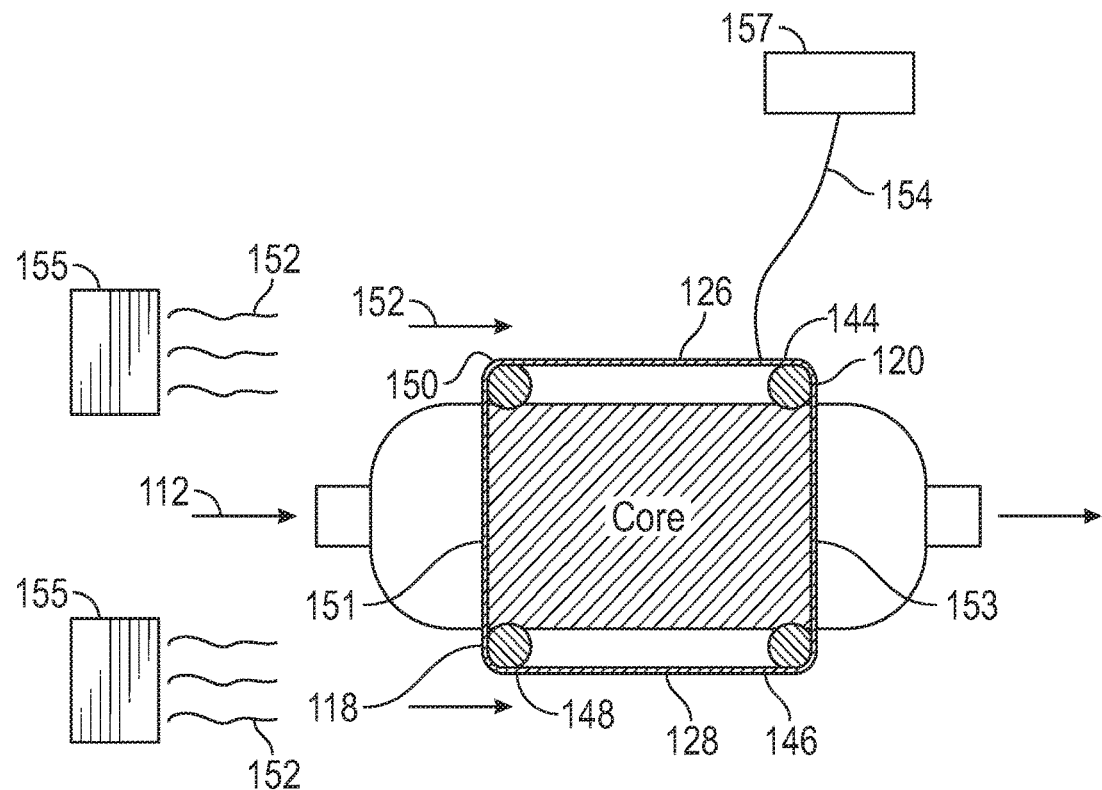
FIG. 5 is a view of a cross-flow plate-fin heat exchanger according to an embodiment.
Figure 6:
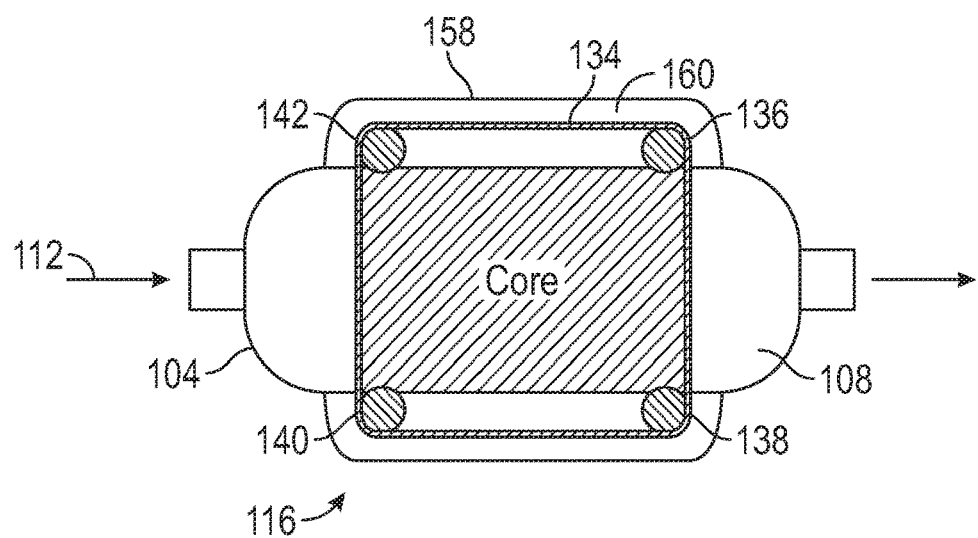
FIG. 6 is a view of a cross-flow plate-fin heat exchanger according to an embodiment.

As shown in FIGS. 4-6, the screen 134 may be spaced from the core surface by a plurality of rollers 136-142 distributed about the core. The rollers 136-142 may each have a long axis defined by the rotational axis of the respective rollers. The rollers may be oriented such that the long axis of each roller extends between the third side 122 of the core and the fourth side 124 of the core. The first roller 136 and the fourth roller 142 are disposed between the screen 134 and the fifth side 126 of the core for frictional engagement therebetween. The second roller 138 and the third roller 140 are disposed between the screen 134 and the sixth side 128 of the core for frictional engagement therebetween. With this configuration, the rollers may frictionally engage the screen so that the screen may move about the core. Alternatively, the screen may mate with the rollers in a sprocket and chain type of arrangement rather than in a frictional arrangement.

The four rollers 136-142 may be respectively positioned proximate one of four corners 144-150 of the core or at intersections between adjacent sides of the core. That is, a first roller 136 may be proximate a first corner 144 of the core, at an intersection of the second side 120 of the core and the fifth side 126 of the core. A second roller 138 may be proximate a second corner 146 of the core, at an intersection of the second side 120 of the core and the sixth side 128 of the core. A third roller 140 may be proximate a third corner 148 of the core, at an intersection of the first side 118 of the core and the sixth side 128 of the core. A fourth roller 142 may be proximate a fourth corner 150 of the core, at an intersection of the first side 118 of the core and the fifth side 126 of the core.

A motor 129 (illustrated schematically) drives at least one of the rollers. This action moves the screen due to, for example, the frictional engagement between the screen and the at least one of the rollers. In an alternative embodiment that includes the sprocket and chain arrangement between the roller and screen, the motor driven roller would drive the screen due to mechanical interaction therebetween. The motor 129 may drive the screen continuously, at a periodic rate that is sufficient to prevent an accumulation of ice on the screen, upon sensing a predetermined amount of ice accumulation, or upon sending various atmospheric conditions indicative of potential ice buildup, such as ambient air temperature, pressure and/or humidity. With this configuration the screen 134, wrapped around the core 116, moves around the core under action of the motor.

The ice accumulates on a first portion 151 of the screen 134 disposed at the first inlet header 104. As more ice accumulates on the screen 134, the screen may begin to clog. The movement of the screen 134 about the heat exchanger 102 may remove or melt the ice before the ice could clog the screen. That is, the screen 134 moves about the core 116, on the rollers, which moves the first portion 151 of the screen 134 away from the first inlet header 104. At the same time, moving the screen 134 brings a second portion 153 of the screen to the first inlet header. From this movement, the first portion 151 of the screen 134, which may be ice clogged, is moved to the first outlet header 108. The first stream 112, warmed by flowing through the core 116, may clear the iced portion 151 of the screen 134 at the first outlet header 108.

Under certain conditions, the first stream 112 at the cold outlet 108 may not be sufficient to clear ice from the screen 134. Thus, the screen may need to be heated using an additional implement. As illustrated in FIG. 4, additional heating of the screen 134 may be accomplished by passing a second warm flow 152 of air, from a second source 155 of warm air, over the moving screen 134. The screen 134 may also or alternatively be heated directly by electrical connectors 154 connected to a source of electric current 157 and connected to the screen 134.

Turning to FIG. 6, to minimize leakage of the cold air around the screen 134 and rollers 136-142, an enclosure 158 may be provided. The enclosure 158 may enclose the screen 134 and core 116 to define a cavity 160 therein. Flow leaking around the screen 134 at the cold inlet 104 may be contained within the cavity 160 and directed to the cold outlet 108. This configuration may be applicable to fluids other than air, for example, filtering ice out of cold fuel.

Figure 7:
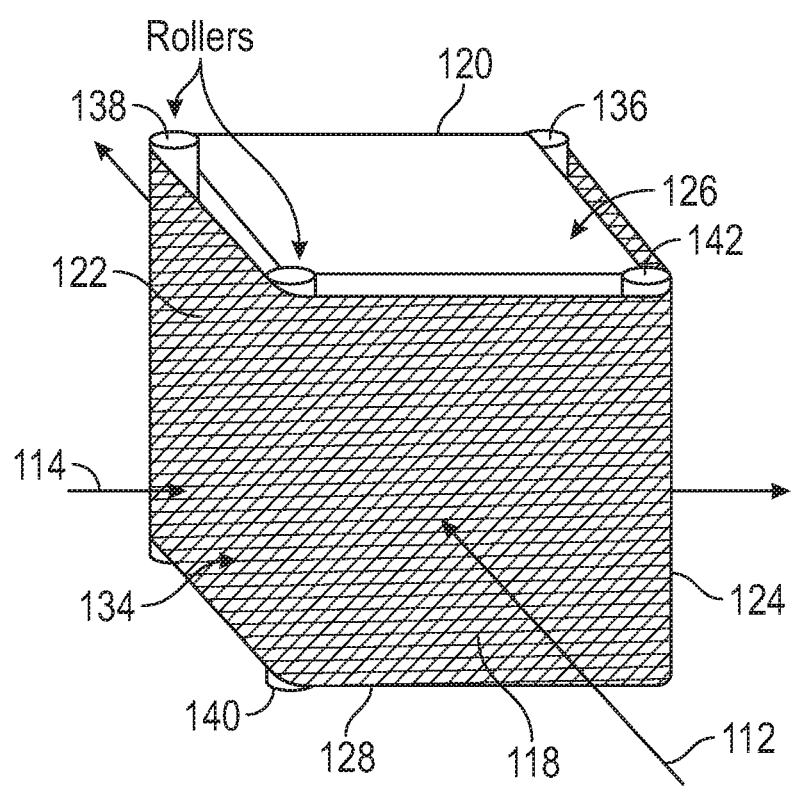
FIG. 7 is a view of a cross-flow plate-fin heat exchanger according to an embodiment.

Turning to FIG. 7, the screen 134 may cover the first side 118 of the core along with the first core inlet, the second side 120 of the core along with the first core outlet, the third side 122 of the core along with the second core inlet and the fourth side 124 of the core along with the second core outlet. In this configuration the screen 134 does covers neither the fifth side 126 of the core, which has the first cap sheet, nor the sixth side 128 of the core, which has the second cap sheet. This configuration may be suitable where the hot stream 114 may be air, and mixing of the hot stream 114 and cold stream 112 may be acceptable. In this configuration the hot stream 114 passes through the screen 134 at the second core inlet, by which the screen is provided with additional heat as the screen moves about the core. This configuration may further melt ice and may prevent ice from forming on the screen.

The rollers 136-142 in the configuration of FIG. 7 may be disposed between the third side 122 of the core and the screen 134, as well as between the fourth side 124 of the core and the screen. Alternatively the rollers 136-142 in this configuration may be disposed between the first side 118 of the core and the screen 134, and between the second side 120 of the core and the screen.

The above disclosure may prevent icing of heat exchangers by filtering ice out of the airstream before ice enters the heat exchanger core. The configuration may eliminate or reduce the need for other implements for mitigating heat exchanger icing. This configuration may have minimal impact on the overall performance, weight, and volume of the heat exchanger. Though the above disclosure is directed to a heat exchanger having a moveable screen wrapped around a core, the disclosure may be applicable to any apparatus having a moving a screen around a core.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger for a thermal management system of an aircraft assembly, the heat exchanger comprising:
a core including: a first side with a first core inlet;
a second side that opposes the first side and includes a first core outlet, wherein the first core inlet is in fluid communication with the first core outlet; and
a third side having a second core inlet and a fourth side that opposes the third side and includes a second core outlet, wherein the second core inlet is in fluid communication with the second core outlet, and
a screen wrapped around the core, the screen covering the first core inlet, the first core outlet, the second core inlet, and the second core outlet; and
a plurality of rollers disposed between the core and the screen for movably securing the screen to the core, the plurality of rollers engaging the screen and wherein movement of at least one of the plurality of rollers causes the screen to move about the core,
wherein the heat exchanger is a cross-flow plate-fin heat exchanger configured to utilize a first stream of cold air to cool a second stream of warm air.

2. The heat exchanger of claim 1, further comprising a motor that drives the at least one roller of the plurality of rollers.

3. The heat exchanger of claim 2, wherein the heat exchanger core comprises a fifth side and an opposing sixth side, wherein the fifth side comprises a first cap sheet and the sixth side comprises a second cap sheet.

4. The heat exchanger of claim 3, wherein the screen covers the first side of the core, the second side of the core, the fifth side of the core and the sixth side of the core, and wherein the set of rollers includes a first set of rollers disposed between the fifth side of the core and the screen and a second set of rollers disposed between the sixth side of the core and the screen.

5. The heat exchanger of claim 3, wherein the screen covers the first side of the core, the second side of the core, the third side of the core and the fourth side of the core.

6. The heat exchanger of claim 5, wherein the set of rollers includes a first set of rollers disposed between the third side of the core and the screen and a second set of rollers disposed between the fourth side of the core and the screen.

7. The heat exchanger of claim 5, wherein the set of rollers includes a first set of rollers disposed between the first side of the core and the screen and a second set of rollers disposed between the second side of the core and the screen.

8. The heat exchanger of claim 1, wherein electrical connectors are connected to the screen for transferring electric current to the screen.

9. The heat exchanger of claim 1, wherein an enclosure encloses the screen and the core, and the enclosure fluidly connects a cavity defined between the enclosure and the core to the first core outlet.

10. An aircraft, comprising:
a gas turbine engine operatively coupled to the aircraft, the gas turbine engine comprising a fan, a compressor, a combustor and a turbine; and
a thermal management system operatively coupled to the gas turbine engine, the thermal management system including a heat exchanger, the heat exchanger comprising:
a core including: a first side with a first core inlet; a second side that opposes the first side and includes a first core outlet, wherein the first core inlet is in fluid communication with the first core outlet; and a third side having a second core inlet and a fourth side that opposes the third side and includes a second core outlet, wherein the second core inlet is in fluid communication with the second core outlet, and
a screen wrapped around the core, the screen covering the first core inlet, the first core outlet, the second core inlet, and the second core outlet; and a plurality of rollers disposed between the core and the screen for movably securing the screen to the core, the plurality of rollers engaging the screen and wherein movement of at least one of the plurality of rollers causes the screen to move about the core,
wherein the heat exchanger is a cross-flow plate-fin heat exchanger configured to utilize a first stream of cold air to cool a second stream of warm air.

11. The aircraft of claim 10, further comprising a motor that drives the at least one roller of the plurality of rollers.

12. The aircraft of claim 11, wherein the heat exchanger core comprises a fifth side and an opposing sixth side, wherein the fifth side comprises a first cap sheet and the sixth side comprises a second cap sheet.

13. The aircraft of claim 12, wherein the screen covers the first side of the core, the second side of the core, the fifth side of the core and the sixth side of the core, and wherein the set of rollers includes a first set of rollers disposed between the fifth side of the core and the screen and a second set of rollers disposed between the sixth side of the core and the screen.

14. The aircraft of claim 12, wherein the screen covers the first side of the core, the second side of the core, the third side of the core and the fourth side of the core.

15. The aircraft of claim 14, wherein the set of rollers includes a first set of rollers disposed between the third side of the core and the screen and a second set of rollers disposed between the fourth side of the core and the screen.

16. The aircraft of claim 15, wherein the set of rollers includes a first set of rollers disposed between the first side of the core and the screen and a second set of rollers disposed between the second side of the core and the screen.

17. The aircraft of claim 10, wherein electrical connectors are connected to the screen for transferring electric current to the screen.

18. The aircraft of claim 10, wherein an enclosure encloses the screen and the core, and the enclosure fluidly connects a cavity defined between the enclosure and the core to the first core outlet.

* * * * *